United States Patent
Reyneri et al.

(10) Patent No.: US 7,973,846 B2
(45) Date of Patent: Jul. 5, 2011

(54) DIGITAL IMAGE CAPTURE HAVING AN ULTRA-HIGH DYNAMIC RANGE

(75) Inventors: Justin Reyneri, Los Altos, CA (US); William R. Bidermann, Los Gatos, CA (US); Benjamin P. Olding, Redwood City, CA (US)

(73) Assignee: PIXIM, Inc., Mountain View, CA (US)

( * ) Notice: Subject to any disclaimer, the term of this patent is extended or adjusted under 35 U.S.C. 154(b) by 382 days.

(21) Appl. No.: 12/043,897

(22) Filed: Mar. 6, 2008

(65) Prior Publication Data

US 2008/0158400 A1 Jul. 3, 2008

Related U.S. Application Data

(63) Continuation of application No. 10/185,584, filed on Jun. 26, 2002, now Pat. No. 7,362,365.

(51) Int. Cl.
*H04N 3/14* (2006.01)
*H04N 5/335* (2006.01)
*H04N 5/228* (2006.01)

(52) U.S. Cl. .................. 348/308; 348/297; 348/302

(58) Field of Classification Search .................. 348/302, 348/308–310
See application file for complete search history.

(56) References Cited

U.S. PATENT DOCUMENTS

| | | | |
|---|---|---|---|
| 5,920,274 A * | 7/1999 | Gowda et al. | 341/155 |
| 6,271,785 B1 | 8/2001 | Martin et al. | |
| 6,330,030 B1 | 12/2001 | O'Connor | |
| 6,344,877 B1 | 2/2002 | Gowda et al. | |
| 6,377,303 B2 | 4/2002 | O'Connor | |
| 6,538,593 B2 | 3/2003 | Yang | |
| 6,704,046 B2 * | 3/2004 | Dyas et al. | 348/223.1 |
| 6,946,635 B1 * | 9/2005 | Pine | 250/208.1 |
| 2003/0076432 A1 * | 4/2003 | Luo et al. | 348/308 |

OTHER PUBLICATIONS

"Understanding Flash ADCs," Maxim, Dallas Semiconductor, Application Note 810, Oct. 2, 2001, pp. 1-7.

* cited by examiner

*Primary Examiner* — Lin Ye
*Assistant Examiner* — Carramah J Quiett
(74) *Attorney, Agent, or Firm* — Patent Law Group LLP; Carmen C. Cook

(57) ABSTRACT

An image capture method in a digital image sensor implements a continuous sampling technique with a massively parallel thermometer-code analog-to-digital conversion (ADC) technique to generate pixel data having an intrinsic to an ultra-high dynamic range. In one embodiment, the method includes, after an initial exposure period, sampling pixel intensity values at the pixel elements of an image sensor at multiple sampling intervals within a snapshot of a scene; providing an analog reference voltage corresponding to a decrementing digital count value; and comparing the pixel intensity values to the analog reference voltage at each of the multiple sampling intervals. If the pixel intensity value of a first pixel element is less than the analog reference voltage at a first exposure time, an output signal having a first value is generated and the digital count value is recorded as pixel data associated with the first pixel element.

29 Claims, 12 Drawing Sheets

DIGITAL IMAGE CAPTURE HAVING AN ULTRA-HIGH DYNAMIC RANGE

CROSS REFERENCE TO RELATED APPLICATION

This application is a continuation of application Ser. No. 10/185,584, filed Jun. 26, 2002, entitled "Digital Image Capture having an Ultra-high Dynamic Range" of the same inventors hereof, which application is incorporated herein by reference in its entirety.

FIELD OF THE INVENTION

The invention relates to image sensor systems and, in particular, to an image capture method to be applied in an image sensor for capturing image data having a normal to an ultra-high dynamic range.

DESCRIPTION OF THE RELATED ART

Digital imaging devices, such as digital cameras, use an image sensor or a photosensitive device to sense the light intensity level of a scene. Conventional image sensors include charge coupled devices (CCD) and CMOS image sensors. CMOS image sensors are preferred over CCD image sensors in part because CMOS image sensors consume less power and are thus more suitable for portable applications. However, CMOS image sensors generally suffer from poor image quality because CMOS image sensors generally have a low dynamic range in image capability. Conventional CMOS image sensors are capable of recording about 10 bits of a scene's dynamic range. That is, the image sensor can measure about 1024 different levels of light intensity values. Methods for improving the dynamic range of CMOS image sensors have been applied to improve the quality of the captured image. However, these methods do not always provide satisfactory results.

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy, reduce power consumption, and improves overall system performance.

In the DPS array of the '425 patent, the analog-to-digital conversion (ADC) is based on first order sigma delta modulation. While this ADC approach requires fairly simple and robust circuits, it has the disadvantages of producing too much data and suffering from poor low light performance. U.S. Pat. No. 5,801,657 of B. Fowler et al. describes a Multi-Channel Bit Serial (MCBS) analog-to-digital conversion technique which can be advantageously applied in a digital pixel sensor for performing massively parallel analog-to-digital conversions. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout. The aforementioned patents are incorporated herein by reference in their entireties.

Copending and commonly assigned U.S. patent application Ser. No. 09/567,638, entitled "Integrated Digital Pixel Sensor Having a Sensing Area and a Digital Memory Area" of David Yang et al., describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

FIG. 1 duplicates FIG. 3 of the aforementioned '786 patent application and shows a functional block diagram of an image sensor 300. The operation of image sensor 300 using multiple sampling is described in detail in the '786 patent application. Image sensor 300 includes a DPS sensor array 302 which has an N by M array of pixel elements. Sensor array 302 is similar to the digital pixel sensor described in the '425 patent and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information for each pixel indicating whether the light intensity value measured by each pixel in sensor array 302 has exceeded a predetermined threshold level. In this example, the information is stored as a one-bit threshold indicator bit. The exposure time indicating when the light intensity value measured by each pixel has passed the threshold level is stored in time index memory 308. In this example, the time index value is a two-bit value identifying each exposure time. As a result of this memory configuration, the pixel data for each pixel element in sensor array 302 can be individually time-stamped by threshold memory 306 and time index memory 308 and stored in digital pixel data memory 310.

With the memory configuration outlined above and illustrated in FIG. 1, image sensor 300 can implement multiple sampling to improve the quality of an image. In multiple sampling, each pixel element is exposed to an image at two or more different exposure times in order to record both bright and dark portions of the image. Additionally, the information regarding the integrated intensity for each pixel and the exposure time at which the pixel intensity value is recorded are stored in digital memory 310 and time index memory 308 for use in computing the simulated pixel intensity value when needed.

A DPS image sensor employing multiple sampling and MCBS analog-to-digital conversion described above is capable of recording 14 to 16 or more bits of dynamic range in the captured image, in contrast with the 10 bits of dynamic range attainable by conventional image sensors. However, in some applications, an ultra-high dynamic range imaging capability is desired. Furthermore, when multiple sampling is applied, memory space needs to be allocated to store the threshold value and the time index value associated with each pixel element. A method is desired for achieving an ultra high dynamic range in image capture without requiring a large amount of memory space to store the information other than the pixel data.

SUMMARY OF THE INVENTION

According to one embodiment of the present invention, a method in an image sensor includes a two-dimensional array of pixel elements for digitally recording an image of a scene within a snapshot of the scene is described. The method includes after an initial exposure period within the snapshot, sampling pixel intensity values at the pixel elements at multiple exposure times within the snapshot, where each of the pixel intensity values is indicative of a light intensity value impinging on each of the pixel elements in the array; providing an analog reference voltage corresponding to a digital count value which digital count value decrements from an initial count value to a final count value at multiple exposure times; and comparing the pixel intensity values to the analog reference voltage at each of the multiple exposure times. If the pixel intensity value of a first pixel element is less than the analog reference voltage at a first exposure time, an output signal having a first value is generated at the first pixel element. In response to the output signal having the first value, the digital count value corresponding to the analog reference voltage at the first exposure time is recorded as pixel data associated with the first pixel element.

The present invention is better understood upon consideration of the detailed description below and the accompanying drawings.

DETAILED DESCRIPTION OF THE PREFERRED EMBODIMENTS

In accordance with the principles of the present invention, an image capture method in a digital image sensor implements a continuous sampling technique with a massively parallel thermometer-code analog-to-digital conversion (ADC) technique to capture a digital image of a scene having a normal to an ultra-high dynamic range. In one embodiment, during a snapshot of a scene, pixel values generated by photodetectors in an image array are sampled continuously after an initial exposure period. At each sampling interval, the pixel intensity values are compared with a reference voltage corresponding to a digital count which digital count value decrements from a maximum value to a minimum value at each sampling interval. At any given sampling interval, when the pixel intensity value of a pixel is less than the reference voltage corresponding to a particular digital count, the digital count is stored as the pixel data for that pixel and a threshold indicator bit for that pixel is set. After the threshold indicator bit is set, no further update of the pixel data will be performed. The image capture method of the present invention stores the pixel data in k bits and the threshold indicator in one bit. Thus, only minimal memory space is required to practice the image capture method of the present invention. An image sensor in accordance with the present invention can be made with improved yield and reduced manufacturing cost while providing an ultra-high dynamic range in imaging capability.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 2 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 2:
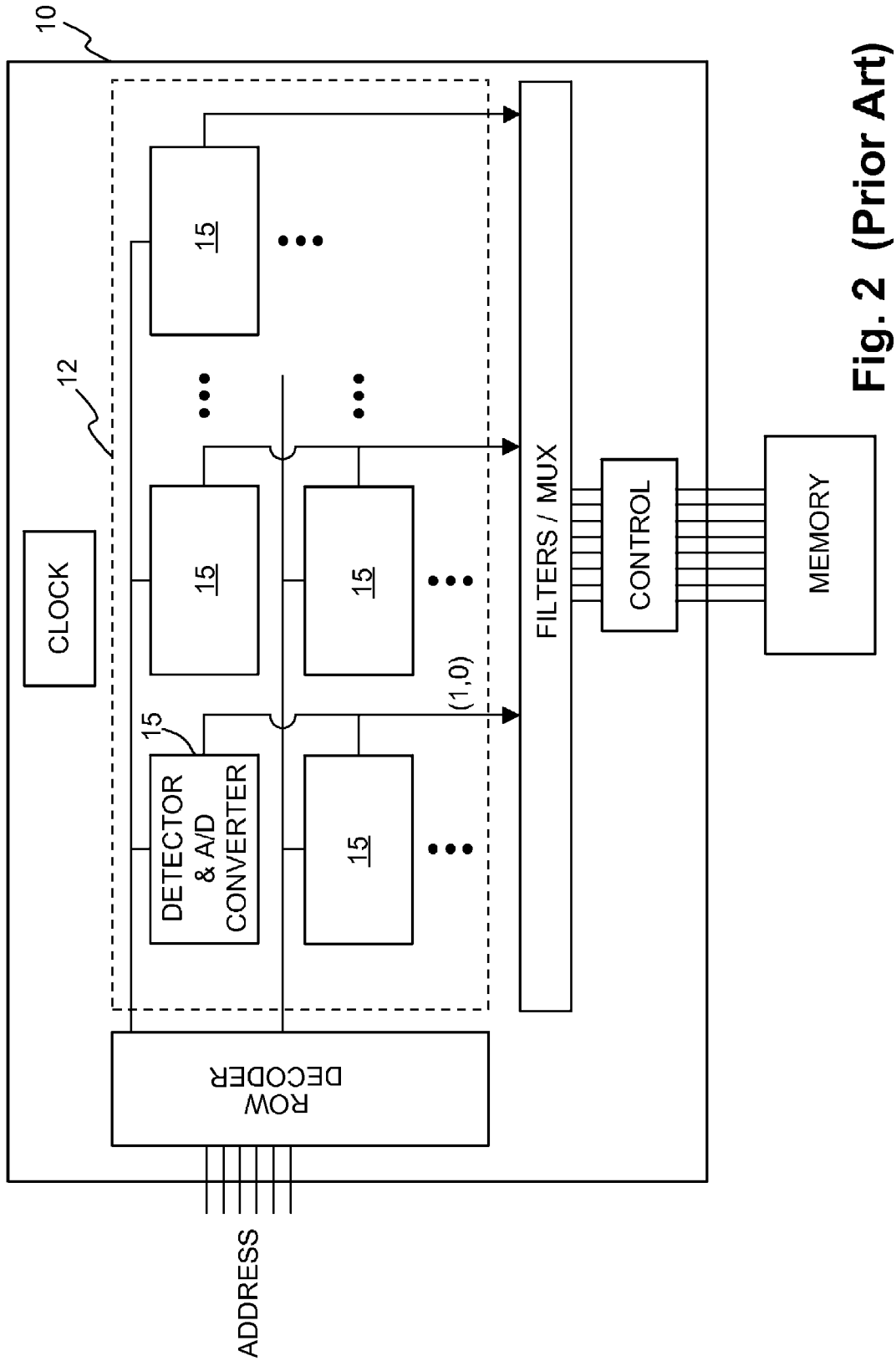
FIG. 2 is a block diagram of a digital image sensor as described in U.S. Pat. No. 5,461,425 of Fowler et al.

In the digital pixel sensor architecture shown in FIG. 2, a dedicated ADC scheme is used. That is, each of pixel elements 15 in sensor array 12 includes an ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetector by multiplexing between the four photodetectors. The shared ADC architecture retains all the benefits of a pixel level analog-to-digital conversion while providing the advantages of using a much smaller circuit area, thus reducing manufacturing cost and improving yield.

Dynamic range of an image sensor is specified as the ratio of the maximum pixel intensity value that can be recorded before the photodetector reaches saturation to the minimum pixel intensity value that can be meaningfully detected above the noise level. An imaging system that can measure a maximum intensity value of 1023 and a minimum intensity value of 1 has a dynamic range of 1023 or 10 bits. As described above, the dynamic range of conventional CMOS image sensors is generally about 10 bits.

In accordance with the present invention, the image capture method includes an intrinsic dynamic range scheme and an ultra high dynamic range scheme. Under the intrinsic dynamic range scheme, the image capture method is applied in an image sensor to capture an image having a dynamic range that is intrinsic to the capability of the photosensitive device. That is, if the photosensitive device has a dynamic range of 10 bits, the image capture method can be operated to generate image data having at least 10 bits of dynamic range. Under the ultra high dynamic range scheme, the image capture method of the present invention is applied in an image sensor to capture an image having a dynamic range that is greater than the imaging capability of the photosensitive device. In general, an ultra high dynamic range that is 2 times or more of the intrinsic dynamic range of the photosensitive device can be attained.

Figure 1:
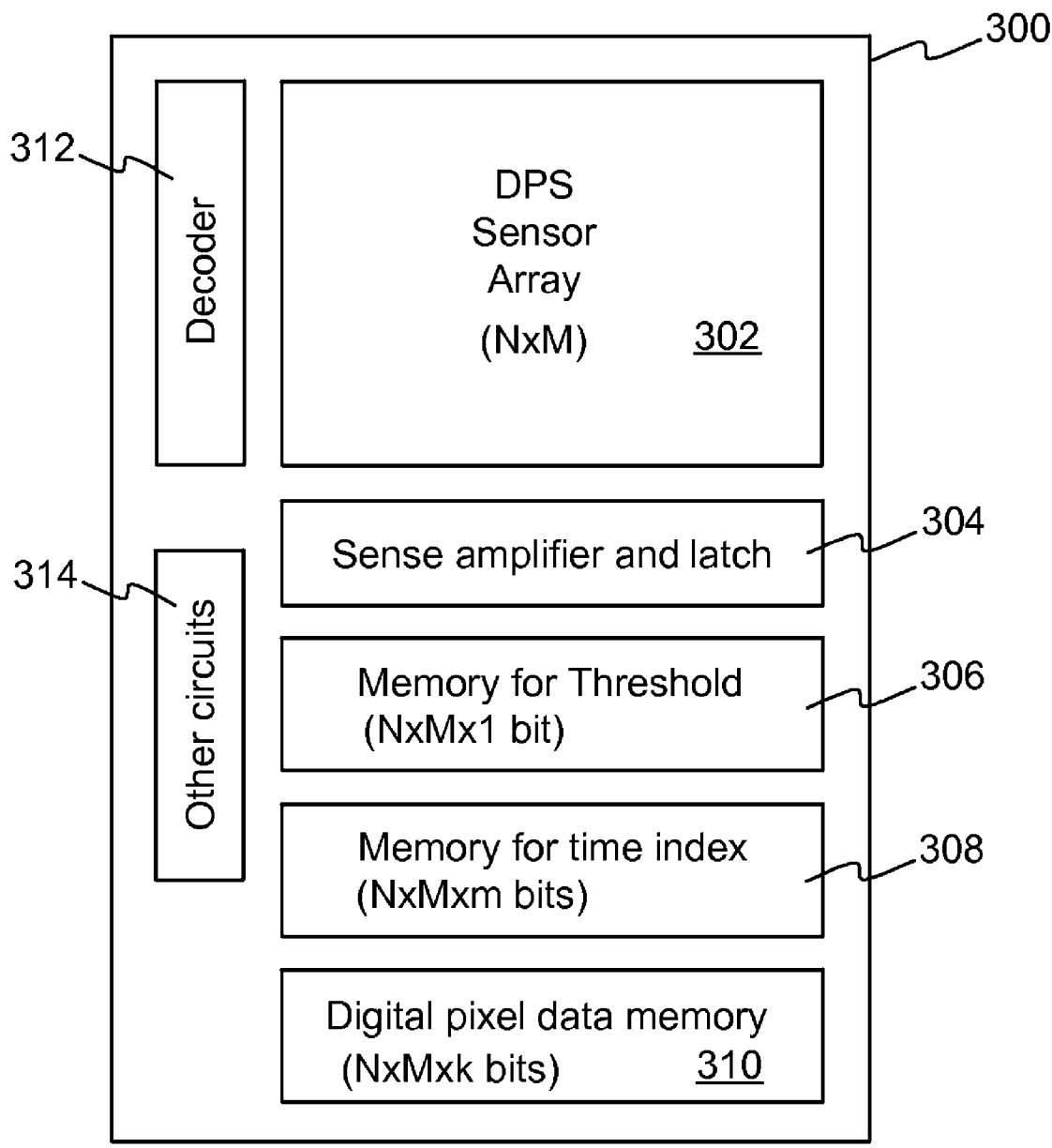
FIG. 1 is a functional block diagram of an image sensor as described in U.S. patent application Ser. No. 09/567,786.
Figure 3:
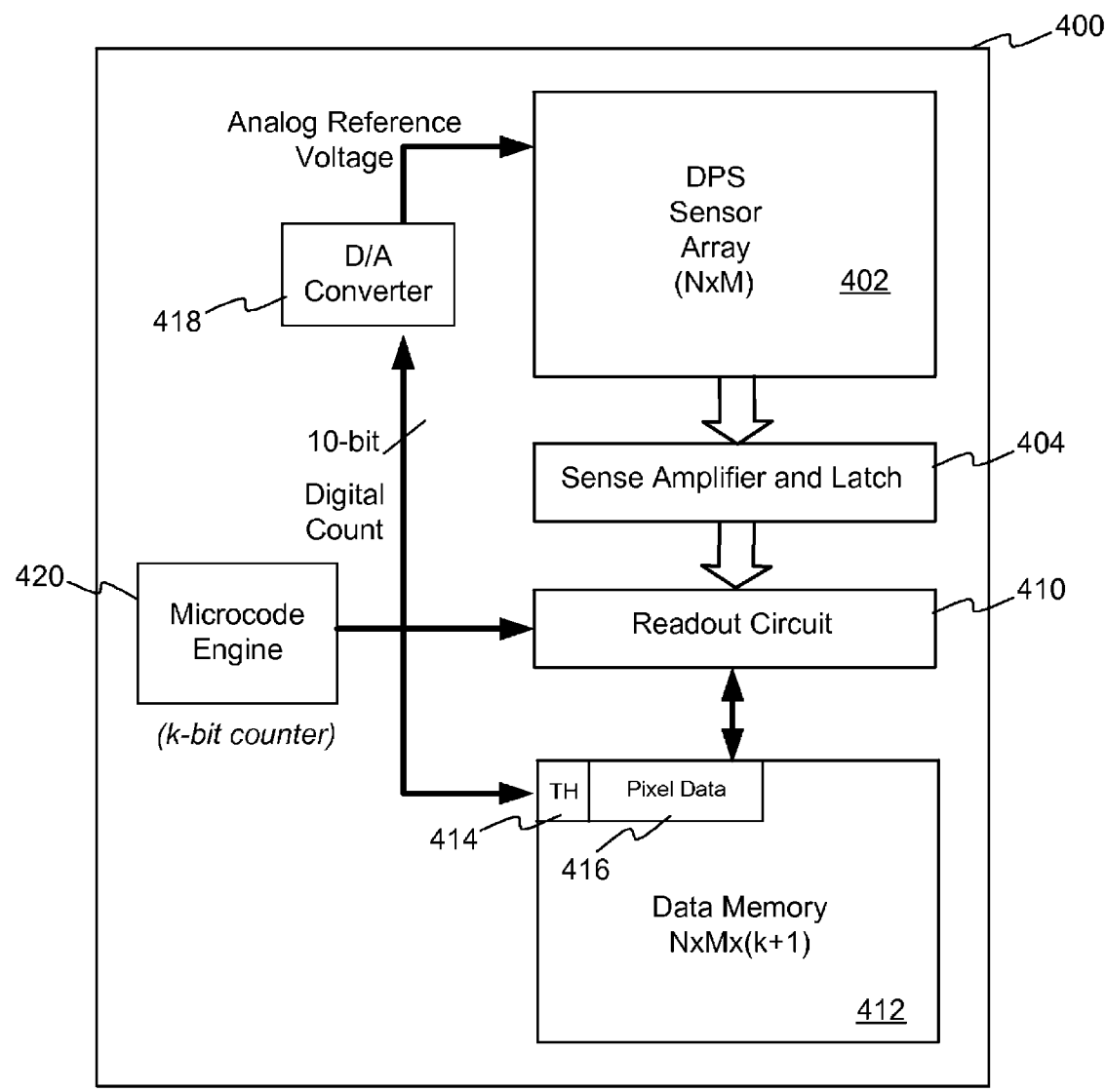
FIG. 3 is a functional block diagram of a digital imaging system according to one embodiment of the present invention in which the image capture method of the present invention can be practiced.

FIG. 3 is a functional block diagram of an image sensor 400 according to one embodiment of the present invention in which the image capture method of the present invention can be practiced. Referring to FIG. 3, image sensor 400 includes a DPS sensor array 402 which operates to generate at each pixel location digital data as an output signal. In contrast with DPS sensor array 302 of FIG. 1 which applies MCBS ADC and generates a k-bit digital code at each pixel location indicative of the pixel intensity value, DPS sensor array 402 implements the massively parallel thermometer-code ADC technique of the present invention and provides a 1-bit output signal indicative of the status of the pixel intensity value. In the present description, the 1-bit output signal generated at each pixel element is referred to as the "threshold indicator bit." The operation of the massively parallel thermometer-code ADC technique will be described in more detail below.

In the present embodiment, DPS sensor array 402 includes an N×M array of pixel elements. Image sensor 400 may further include support circuitry to facilitate the read out of digital data from sensor array 402. In FIG. 3, image sensor 400 includes a sense amplifier and latch circuit 404 coupled to sensor array 402 and a readout circuit 410 coupled to receive the digital data from array 402 and facilitate the storage of the digital data into corresponding memory locations in a data memory 412. Image sensor 400 may include other circuitry such as an address decoder (not shown) and other control circuits (not shown).

In the present embodiment, the pixel data is expressed in k bits and the size of data memory 412 is N×M×(k+1) bits. When image sensor 400 practices the image capture method of the present invention, data memory 412 only needs to provide sufficient memory space to store the k-bit pixel data and the additional threshold indicator bit for each of the pixel elements in the array. Referring to FIG. 3, for each pixel element, k bits of memory space (memory location 416) are allocated to store the pixel data and 1 bit of memory space (memory location 414) is allocated to store the threshold indicator bit. In the present illustration, contiguous memory locations are provided to store the threshold indicator bit and the pixel data for a pixel element. This is illustrative only and in other embodiments, other memory configuration can be used to store the pixel data and the threshold indicator bit for all of the pixel elements. When the image capture method of the present invention is implemented, the size of data memory 412 can be made as small as possible while allowing image sensor 400 to capture images having an ultra-high dynamic range. Other components of image sensor 400 will be described in more detail below in reference to the operation of the image capture method of the present invention.

Figure 4:
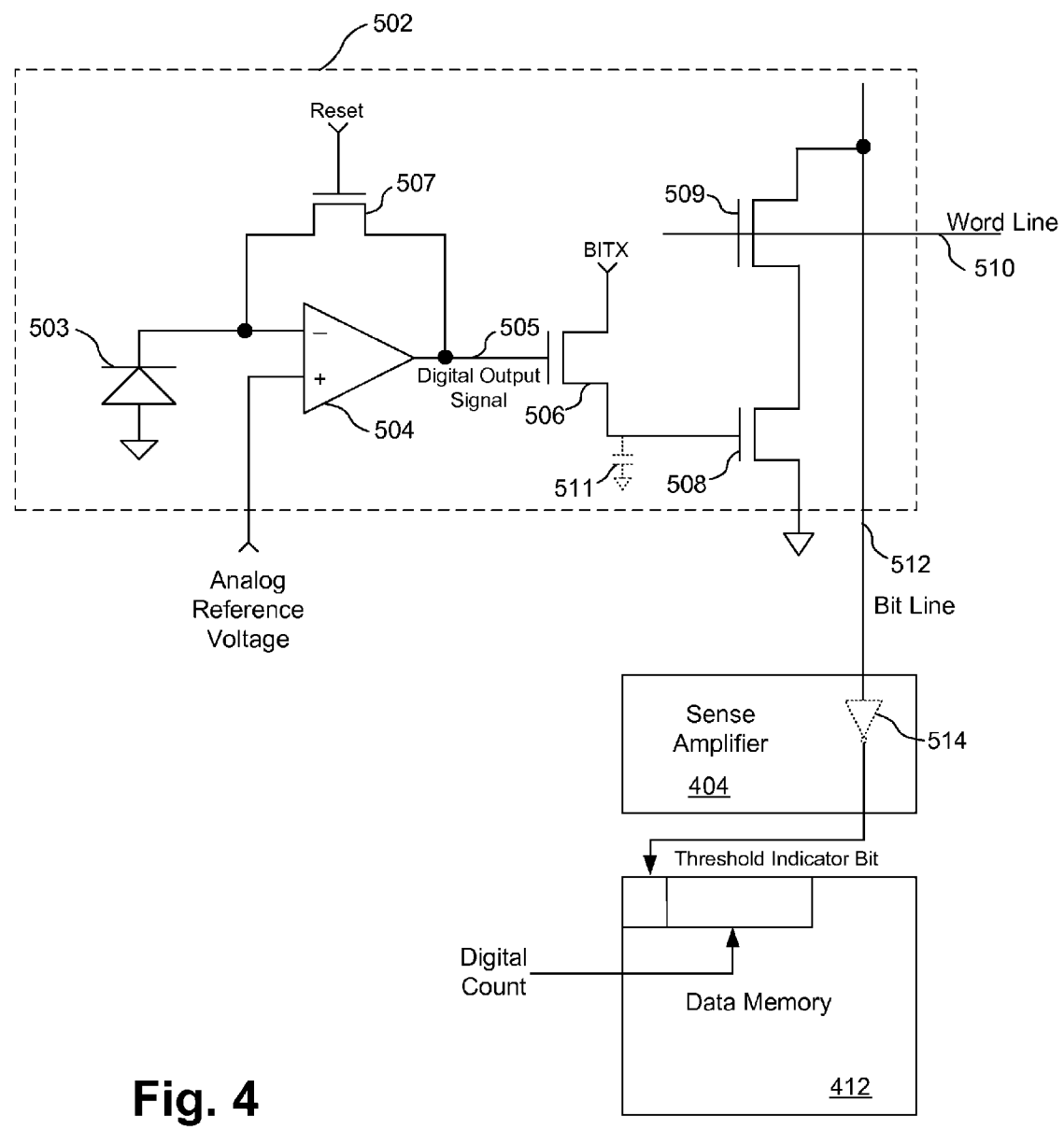
FIG. 4 is a schematic diagram of a pixel element, with associated circuitry, according to one embodiment of the present invention which pixel element can be used to form the DPS sensor array of FIG. 3.

FIG. 4 is a schematic diagram of a pixel element, with associated circuitry, according to one embodiment of the present invention which pixel element can be used to form the DPS sensor array of FIG. 3. In FIG. 4, a pixel element 502 includes a photodetector 503 for collecting incident light and a comparator 504 for performing pixel level ADC in accordance with the image capture method of the present invention. In FIG. 4, photodetector 503 is shown as a photodiode. Photodetector 503 can be any other photosensitive devices that produce electrical charge in response to incident light, such as a photogate or a phototransistor. Photodetector 503 produces an electrical signal when exposed to light. The electrical signal, referred to as the pixel intensity value or the pixel voltage, is proportional to the strength of the incident light times the exposure time. Typically, photodetector 503 is reset to a known state before each light integration operation. In pixel element 502, a reset transistor 507 is connected across the output terminal of photodetector 503 and the output terminal of comparator 504 to form a negative feedback loop for resetting the photodetector. The use of reset transistor 507 is illustrative only and in other embodiments, other reset circuitry can be used in pixel element 502 to reset photodetector 503. The exact nature of the reset circuit or the reset operation in pixel element 502 is not critical to the present invention.

In the present embodiment, photodetector 503 is reset to a predefined maximum pixel voltage and discharges during the light integration period to a minimum pixel voltage. In one embodiment, the maximum pixel voltage, representing the darkest intensity value, is 1.0 volt while the minimum pixel voltage, representing the brightest intensity value, is 0.5 volts. In other embodiments, photodetector 503 can be reset to a state of zero accumulated charge and accumulates charges during the light integration period. In that case, the relative values of the pixel voltage will be reversed, as understood by one of ordinary skill in the art.

The pixel intensity values generated by photodetector 503 can be represented as digital data, referred to as digital pixel values. In the present embodiment, the change in pixel voltage is inversely proportional to the digital pixel value. That is, the maximum pixel voltage (e.g. 1V), representing the darkest signal, corresponds to the smallest digital pixel value (e.g. 0). The minimum pixel voltage (e.g. 0.5V), representing the brightest signal, corresponds to the largest digital pixel value (e.g. 1023 for a 10-bit representation). In other embodiments, the pixel voltage can be directly proportional to the digital pixel value.

Returning to FIG. 4, in pixel element 502, the pixel intensity value generated by photodetector 503 is coupled to the negative input terminal of comparator 504. Comparator 504 compares the pixel intensity value of photodetector 503 with an analog reference voltage coupled to the positive input terminal of the comparator. As will be described in more detail below, the analog reference voltage is inversely proportional to a digital count value generated by a microcode engine 420 in image sensor 400. The digital count value is a decreasing ramp signal and decrements at each sampling interval of the image capture method of the present invention. Accordingly, the analog reference voltage, functioning as the comparator threshold, increases in voltage level from the minimum pixel voltage (0.5V) to the maximum pixel voltage (1V). The output signal of comparator 504 will flip from a logical "0" value to a logical "1" value when the pixel voltage is less than the analog reference voltage corresponding to the digital count value.

Using the analog reference voltage corresponding to a digital count value, comparator 504 performs pixel level ADC of the pixel intensity value and generates a digital output signal on an output terminal 505 of comparator 504. The digital output signal indicates the status of the pixel intensity value and will be readout and stored in data memory 412 as the threshold indicator bit for the particular pixel element. FIG. 4 illustrates one exemplary embodiment of pixel element 502 where a latch (transistor 506) and an output stage (transistors 508 and 509) are used to facilitate readout of the digital output signal. However, other conventional memory cell access techniques can be used to facilitate the reading of the digital output signal from the pixel element. Moreover, one of ordinary skill in the art would appreciate that, depending on the access technique used, the polarity of the digital output signal may be reversed from the present embodiment. The exact polarity of the digital output signal and the threshold indicator bit is not critical to the present invention as long as the proper polarity is maintained consistently throughout the operation of the image capture method of the present invention.

Referring to FIG. 4, the digital output signal drives the control terminal (the gate terminal) of a latch formed by a transistor 506. Transistor 506 receives a BITX signal on the drain terminal which has a logical "0" value (0 volt) during reset and a logical "1" value (e.g. the Vdd voltage) during light integration. During reset of photodetector 503, reset transistor 507 is turned on to form a negative feedback loop around comparator 504. In the present embodiment, photodetector 503 is precharged to 1 volt during reset and the voltage at the output terminal of comparator 504 is also at 1 volt during reset, turning on transistor 506. Because BITX has a value of a logical "0" or 0 volt during reset, transistor 506 operates to precharge the source terminal to 0 volt during reset. In the configuration in FIG. 4, the source terminal of transistor 506 functions as a dynamic storage node (denoted by capacitor 511 in dotted line) for latching the value of the digital output signal to be transferred to the output stage.

During the light integration process, reset transistor 507 is turned off, the BITX signal transitions to a logical "1" value (e.g. Vdd voltage), and the output of comparator 504 returns to a zero voltage value. Depending on the pixel voltage at photodetector 503 and the analog reference voltage, comparator 504 provides a logical "0" or a logical "1" as the digital output signal. When the digital output signal remains at a logical "0", transistor 506 is turned off and the dynamic storage node (capacitor 511) retains the precharge voltage value of 0 volt. When the digital output signal switches to a logical "1", transistor 506 is turned on and the dynamic storage node (capacitor 511) is driven to a logical "1" (e.g. Vdd) value.

The output stage of pixel element 502 includes transistors 508 and 509. Specifically, the digital output signal is coupled to the gate terminal of transistor 508 through transistor 506 to be transferred onto a bit line 512 of the sensor array. When the word line 510 for pixel element 502 is asserted, transistor 509 is turned on and the digital output signal causes either bit line 512 to be driven to the ground voltage or to remain at the precharge voltage (typically Vdd). In the present embodiment, when the digital output signal is a logical "1", transistor 508 is turned on and bitline 512 will be pulled to the ground voltage. In image sensor 400 of the present embodiment, sense amplifier 404 inverts the bitline signal (represented by an inverter 514 in dotted line) such that the polarity of the threshold indicator bit that is stored in data memory 412 has the same polarity as the digital output signal from comparator 504. For example, when the digital output signal is a logical "1", the threshold indicator bit for pixel element 502 will also be a logical "1". Conversely, when the digital output signal is a logical "0", transistors 506 and 508 are turned off and bitline 512 remains at the precharge voltage (e.g. Vdd). In this case, sense amplifier 404 inverts the signal and causes a logical "0" to be stored as the threshold indicator bit.

Figure 5:
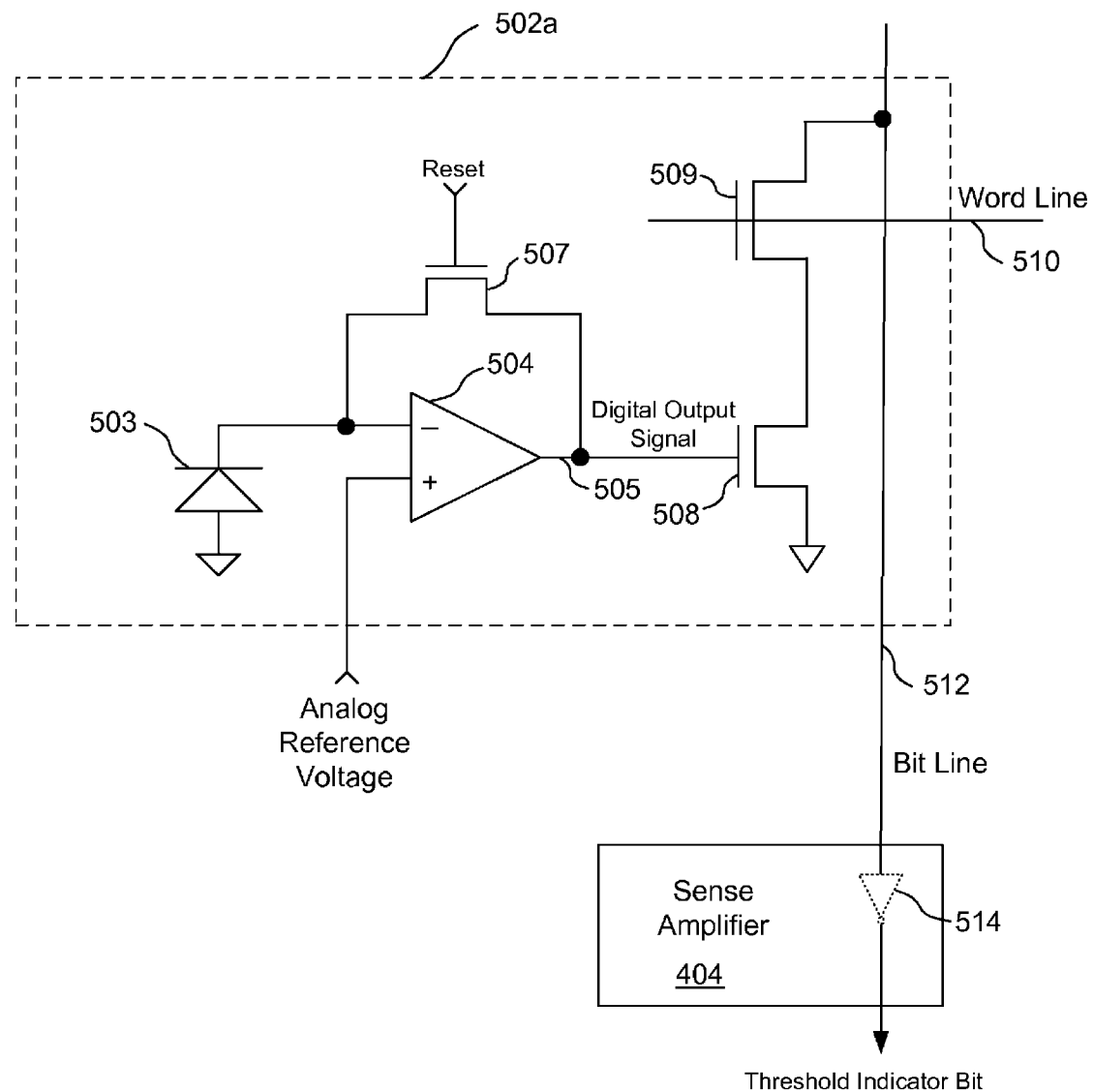
FIG. 5 is a schematic diagram of a pixel element according to another embodiment of the present invention which pixel element can be used to form the DPS sensor array of FIG. 3.
Figure 6:
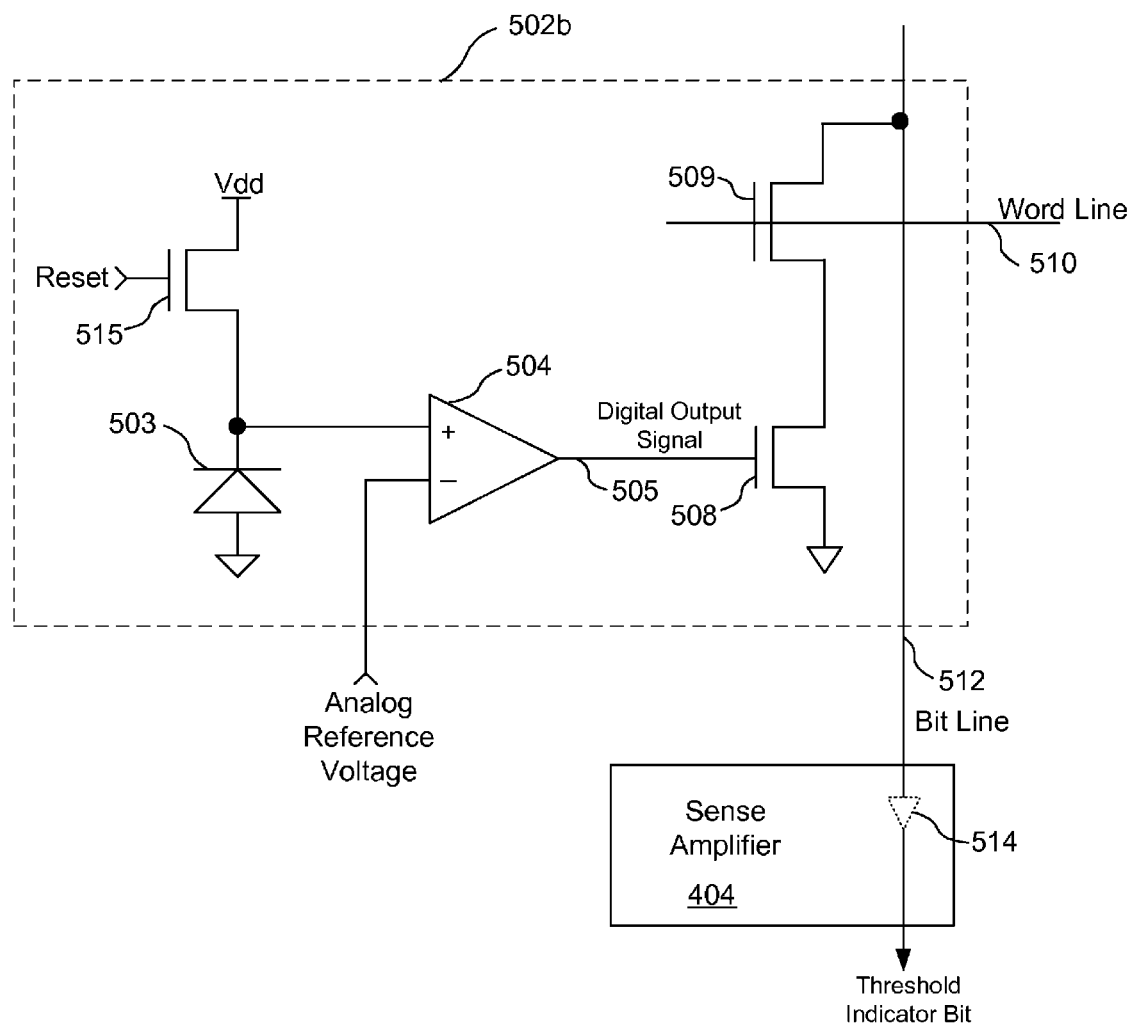
FIG. 6 is a schematic diagram of a pixel element according to yet another embodiment of the present invention which pixel element can be used to form the DPS sensor array of FIG. 3.

As mentioned above, the exact configuration of the latch and the output stage of pixel element 502 is not important to the present invention and other circuit configurations can be applied in pixel element 502 to accomplish the function of reading out the digital output signal. FIGS. 5 and 6 illustrate alternate embodiments of pixel element 502 which can be advantageously applied to facilitate the readout of the digital output signal. Like elements in FIGS. 4, 5 and 6 are given like reference numerals to simplify the discussion.

Referring to FIG. 5, pixel element 502a is configured in the same manner as pixel element 502 of FIG. 4 except that the latch (transistor 506) is eliminated. The output of comparator 504 is connected directly to the gate terminal of transistor 508 of the output stage. Thus, pixel element 502a is a simpler circuit as compared to pixel element 502. The elimination of even a single transistor in a pixel element is advantageous as the size of the pixel element is reduced and the photodetector can be provided with more exposed area for collecting incident light. The polarity of the digital output signal in pixel element 502a is the same as that in pixel element 502 of FIG. 4. Because transistor 508 operates to invert the polarity of the digital output signal, an inverting sense amplifier 404 is used to invert the bitline signal so that the threshold indicator bit for pixel element 502a has the same polarity as the digital output signal from comparator 504.

Referring to FIG. 6, pixel element 502b illustrates an alternate configuration of pixel element 502a of FIG. 5. In FIG. 6, photodetector 503 is coupled to the positive terminal of comparator 504 while the analog reference voltage is coupled to the negative terminal of the comparator. In this configuration, the reset operation is realized by reset transistor 515 which is coupled between photodetector 503 and a power supply (Vdd) terminal. In the configuration shown in FIG. 6, the digital output signal of the comparator will have opposite polarity than the digital output signal in FIGS. 4 and 5. That is, the output of comparator 504 will flip from a logical "1" value a logical "0" value when the pixel voltage is less than the analog reference voltage corresponding to the digital count value. In this case, because transistor 508 of the output stage inverts the polarity of the digital output signal, a non-inverting sense amplifier 404 can be used so that the threshold indicator bit stored in the data memory will retain the same polarity as described above with reference to FIG. 4.

Figure 7A:
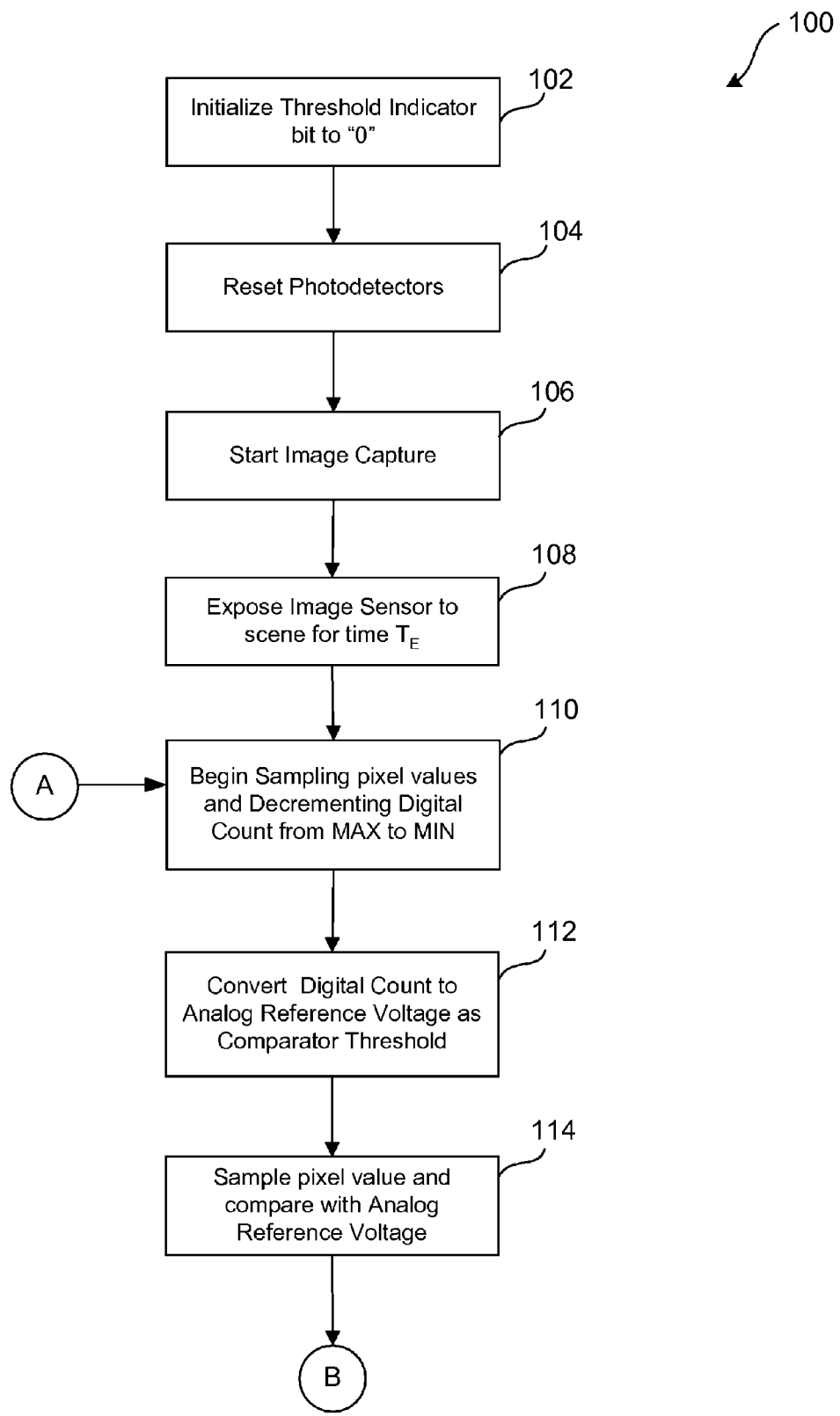
FIGS. 7A and 7B are flowcharts illustrating the image capture method according to one embodiment of the present invention.
Figure 7B:
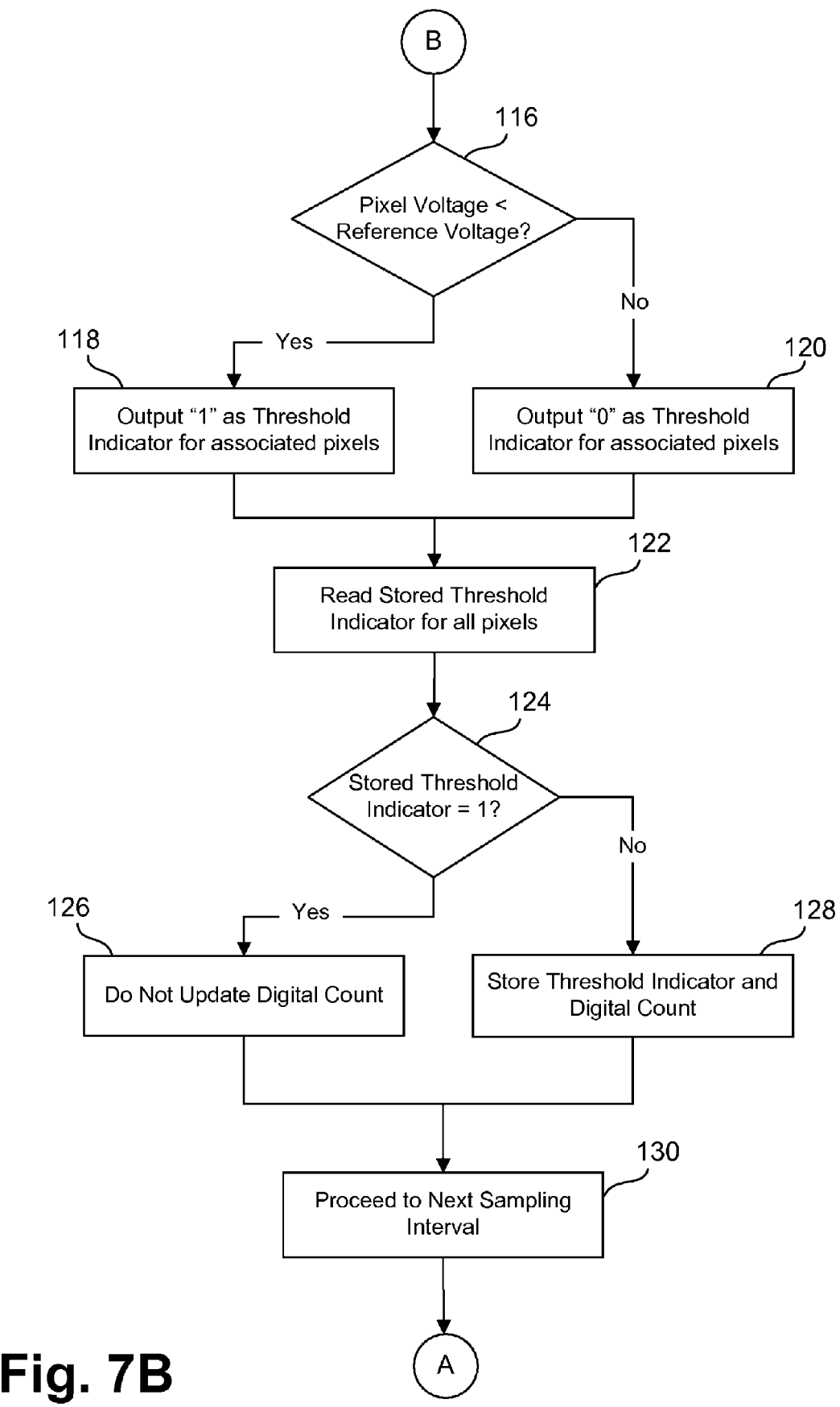

The operation of the image capture method of the present invention under the intrinsic dynamic range scheme will now be described. FIGS. 7A and 7B are flowcharts illustrating the image capture method according to one embodiment of the present invention. In the present description, the image capture method of FIGS. 7A and 7B is implemented in image sensor 400 of FIG. 3 where sensor array 402 of image sensor 400 incorporates pixel elements 502 of FIG. 4. Thus, in the present description, when the pixel voltage is greater than the analog reference voltage, the digital output signal and the threshold indicator bit will have a logical "0" value, indicating that the pixel value has not yet crossed the measurement threshold and may be further updated in subsequent sampling. On the other hand, when the pixel voltage is less than the analog reference voltage, the digital output signal and the threshold indicator bit will have a logical "1" value, indicating that the particular pixel has crossed the measurement threshold and needs to be stored.

Referring to FIG. 7A, at the commencement of each image capture, image capture method 100 first initializes all threshold indicator bits in data memory 412 to a value of "0" (step 102). Then, the photodetectors in sensor array 402 are reset so that all photodetectors are at a known state, such as 1 volt (step 104). At step 106, a snapshot begins by exposing sensor array 402 to the desired scene for capturing an image of the scene. In the present description, a snapshot of a scene is the total exposure time used by image sensor 400 to capture an image of the scene and has an exposure time denoted by $T_{SS}$. Image sensor 400 is exposed to the scene for an initial exposure period of time $T_E$ (step 108). Then, the sampling of pixel intensity values beings (step 110).

Figure 8:
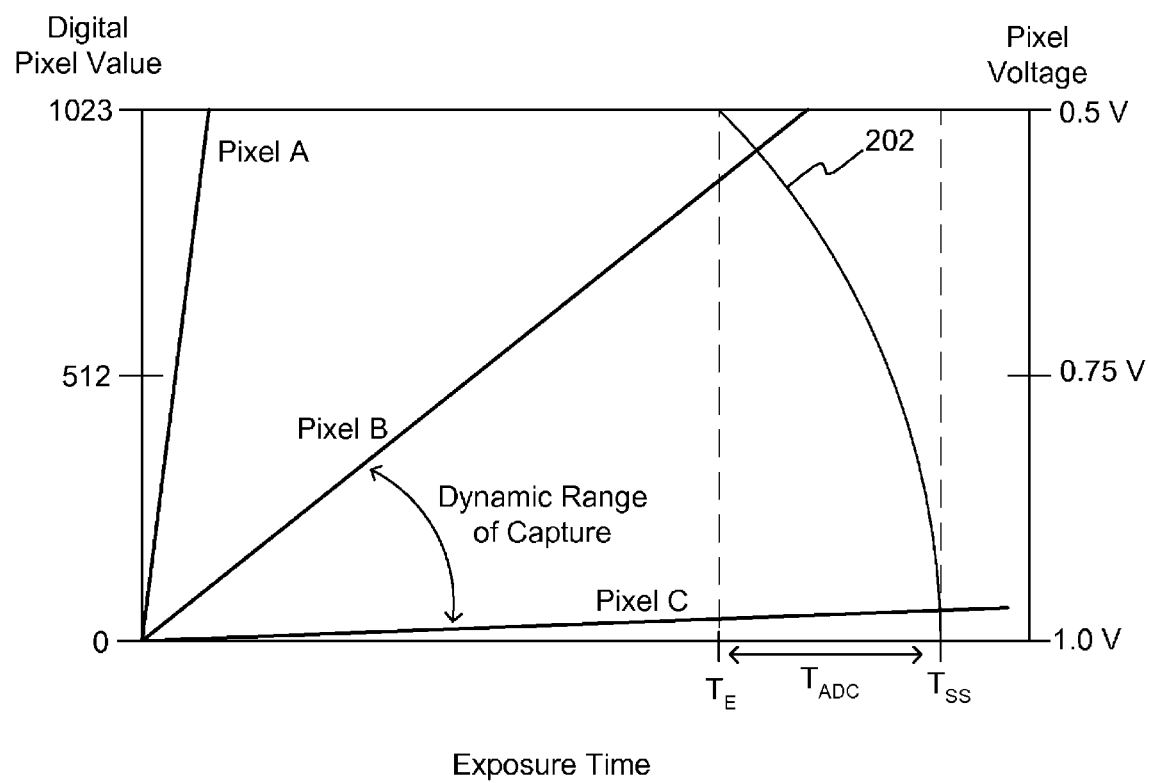
FIG. 8 is a plot of the pixel intensity values vs. exposure time for three representative pixels A, B, and C in the sensor array of FIG. 3 and illustrates the operation of the image capture method under the normal dynamic range scheme according to one embodiment of the present invention.

FIG. 8 illustrates the pixel intensity values vs. exposure time for three representative pixels A, B, and C in sensor array 402. FIG. 8 is provided to illustrate the operation of image capture method 100 of the present invention where a decreasing-ramp digital count value is used to digitize the pixel intensity values. In FIG. 8, a snapshot $T_{SS}$ include the initial exposure time $T_E$ and an analog-to-digital conversion time $T_{ADC}$. The sampling of pixel intensity values for all pixel elements in sensor array 402 begins at the end of the initial exposure period $T_E$. The time scale in FIG. 8 is not drawn to scale and in actual practice, time $T_{ADC}$ constitutes only a small fraction of the total exposure time $T_{SS}$ such that the analog-to-digital conversion time $T_{ADC}$ is negligible. Thus, any change in the pixel intensity values during time $T_{ADC}$ is also negligible.

When pixel value sampling begins, a digital counter is initialized and provides a digital count value from a MAX count value to a MIN count value. In the present embodiment, the digital counter is a k-bit counter and is implemented as microcode engine 420 in image sensor 400. The MAX count value is the maximum pixel intensity value to be captured. Typically, the MAX count value is $2^k-1$ For example, when the pixel data is expressed in k=10 bits, the MAX count value can be $2^{10}-1$ or 1023. The MIN count value is the minimum pixel intensity value to be captured. For pixel data in k bits, the MIN count value is typically less than 10 and in the present embodiment is selected to be 0. The digital count value decrements at each sampling interval from the MAX count value to the MIN count value. Referring to FIG. 8, curve 202 depicts the behavior of the digital count value from exposure time $T_E$ to the end of the snapshot ($T_{SS}$) In the present embodiment, the digital count value decrements from the MAX count value of 1023 to the MIN count value of 0 and 1024 sampling intervals are used. Thus, at each sampling interval, the digital count decrements by the value of one.

Returning to FIG. 7A, at step 112, the digital count value is converted to a corresponding analog reference voltage, such as by using a D/A converter 418 in image sensor 400. As described, the digital count value is inversely proportional to the analog reference voltage. Thus, in the present embodiment, D/A converter 418 receives a 10-bit digital count value as input and is calibrated so that an input digital value of 1023 ($2^{10}-1$) will produce a voltage level indicative of a white or maximally illuminated photodetector (e.g. 0.5V). Similarly, an input digital value of 0 provided to D/A converter 418 will produce a voltage level indicative of a dark or unilluminated photodetector (e.g. 1.0V). The analog reference voltage is coupled to DPS sensor array 402 and functions as the comparator threshold value for each of the comparators in the sensor array. At step 114, the pixel intensity value at each of the pixel elements is sampled and compared with the analog reference voltage corresponding to the digital count value at that sampling interval. For example, at the first sampling interval, the digital count value is 1023 and the corresponding analog reference voltage is 0.5V. Pixel intensity values from each of the pixel elements in sensor array 402 are compared with the analog reference voltage (0.5V) resulting from the D/A conversion of the digital count value of 1023.

Referring to FIG. 7B, at step 116, image capture method 100 determines if pixel intensity value of each of the pixel elements is less than the analog reference voltage in that sampling interval. If the pixel voltage for a particular pixel is less than the analog reference voltage, then the comparator for that pixel will generate a digital output signal having a value of "1" (step 118). Otherwise, if the pixel voltage for a particular pixel is greater than the analog reference voltage, then the comparator for that pixel will generate a digital output signal having a value of "0" (step 120).

Referring to FIG. 8, at a time just after $T_E$ where image capture method 100 is performing the first sampling interval, pixel A has a pixel intensity value that already exceeds the maximum pixel value for image sensor 400 (i.e., 1023), pixel B has a pixel intensity value that is near the maximum pixel value and pixel C has a pixel intensity value that is near the minimum pixel value. In this case, a digital output signal of "1" will be generated for pixel A while digital output signals of "0" will be generated for pixels B and C.

Returning to FIG. 7B, image capture method 100 proceeds to read the stored threshold indicator bit from data memory 412 for all of the pixels (step 122). Image capture method 100 proceeds to determine if the stored threshold indicator value for each of the pixel element has been modified from the initial value of "0" such that no further update should be carried out. If the stored threshold indicator value for a pixel is set to "1" already, then image capture method 100 does not update the threshold indicator bit or the pixel data already stored for that pixel in data memory 412 (step 126). On the other hand, if the stored threshold indicator for a pixel is "0", then image capture method 100 stores the digital output signal as the threshold indicator bit and stores the digital count value at the current sampling interval as the pixel data (step 128).

Referring to FIG. 3, in the present embodiment, microcode engine 420 provides the digital count value to D/A converter 418 to be converted to the corresponding analog reference voltage. Microcode engine 420 also provides the digital count value to readout circuit 410 which controls the read/write operation of data memory 412. In the present implementation, at each sampling interval, the digital count value is written into the pixel data field 416 of all pixel elements whenever the threshold indicator bit for the pixel is set to "0". When the image capture method detects that the pixel intensity value for a particular pixel is less than the analog reference voltage at a given sampling interval, the image capture method will store a logical "1" as the threshold indicator bit in data memory 412 for that particular pixel. A logical "1" value in the threshold indicator bit will operate to prevent further update of the pixel data for that particular pixel.

Next, the current sampling interval is completed and image capture method 100 proceeds to the next sampling interval (130). At each sampling interval, the digital count value is decremented and steps 110 to 130 are repeated to compare the pixel intensity values with the analog reference voltage corresponding to the digital count value. Whenever the pixel intensity value for a particular pixel falls below the analog reference voltage, the digital output signal will be stored as the threshold indicator bit and the corresponding digital count value will be stored as the pixel data for that particular pixel. For example, in FIG. 8, Pixel C has a pixel intensity value of around 0.9 volts (or a digital pixel value of around 10) at exposure time $T_E$. Thus, when the digital count value decrements down to 15 (0.8975V) towards the end of the sampling intervals, the digital output signal for pixel C will finally switch to a logical value of "1". The pixel data (15) and the threshold indicator bit (logical "1") for pixel C will then be stored.

At the end of the sampling intervals (exposure time $T_{SS}$), the digital count value has decremented to the MIN count value and data memory 412 has stored pixel data indicative of the pixel intensity values of each pixel element in sensor array 402. The operation of massively parallel thermometer-code ADC technique in the image capture method of the present invention causes the first digital count value in the sequence of decrementing count values having a corresponding analog reference voltage that is greater than a pixel intensity value to be stored as the pixel data for that pixel. Image capture method 100 thus effectively digitizes the pixel intensity values generated at each pixel element in sensor array 402 and provides a digital representation of the captured image.

The image capture method of the present invention exploits the monotonic characteristics of pixel intensity values. That is, when a photodetector is exposed to incident light, the photodetector voltage will either remain the same or decrease with exposure time. Accordingly, the digital pixel value corresponding to the photodetector voltage will either remain the same or increase with exposure time. Therefore, by applying a decreasing ramp as the comparator threshold in a DPS image sensor, the pixel intensity values for a large number of pixel elements can be determined and digitized in a massively parallel fashion.

Figure 9:
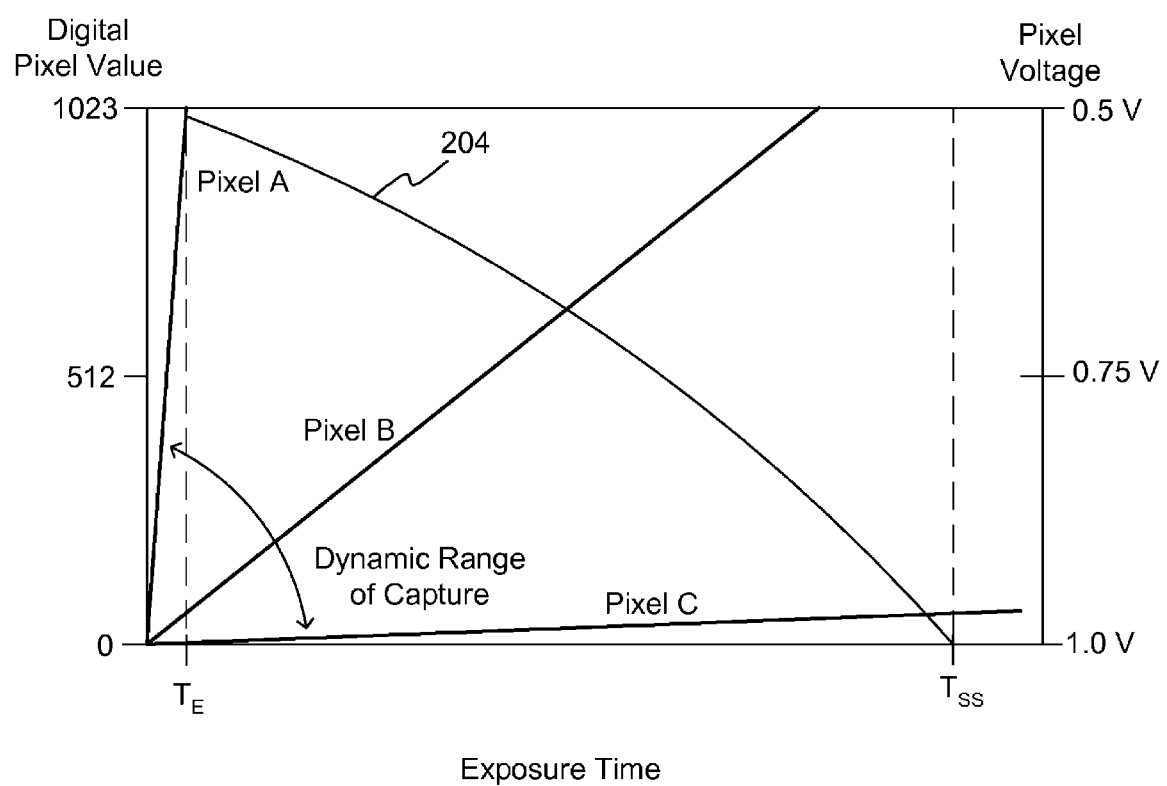
FIG. 9 is a plot of the pixel intensity values vs. exposure time for three representative pixels A, B, and C in the sensor array of FIG. 3 and illustrates the operation of image capture method under the ultra-high dynamic range scheme according to one embodiment of the present invention.

Referring to FIG. 8, as long as the A/D conversion time $T_{ADC}$ is short compared to the total exposure time $T_{SS}$, the pixel data recorded for each pixel elements will be essentially proportional to the total illumination of the scene and a k-bit digital image is generated. The intrinsic dynamic range scheme of the image capture method of the present invention, when applied in image sensor 400, is capable of generating digital representations having a dynamic range that is inherent (or intrinsic) to the image sensor. Thus, if image sensor 400 has a dynamic range capability of k bits, the image capture method operating under the intrinsic dynamic range scheme will generate digital images having a dynamic range of k bits as well. Referring to FIG. 9, image sensor 400 has 10-bit dynamic range. For pixel values that exceeded the maximum pixel value of 1023 by exposure $T_E$ (such as Pixel A), image capture method will store a digital pixel value of 1023 for those pixels.

In an alternate embodiment, companding can be used to generate a non-linear A/D transfer function (curve 202) to reduce the number of steps required for the digital count value to step from the MAX count value to the MIN count value. Companding, derived from compressing and expanding, is a well-known compression technique which uses a non-linear transfer function for the treatment of voice samples. Companding can be effectively applied to image data by exploiting characteristics of human visual perception. Human visual perception is much more acute at low light conditions than at bright light conditions. Therefore, it is more important to capture accurate pixel values for darkly illuminated areas than brightly illuminated areas. The use of companding in a digital image sensor is described in copending and commonly assigned U.S. patent application Ser. No. 09/823,843, entitled "Method and Apparatus for Companding Pixel Data in a Digital Pixel Sensor," by J. Reyneri and B. Olding, filed Mar. 30, 2001, which application is incorporated herein by reference in its entirety.

Thus, in the alternate embodiment, companding is applied so that the digital count values in the image capture method decrement from the MAX count value to the MIN count value in $2^q$ steps, where q is a fraction or an integer number less than k. Specifically, the digital count values decrement in larger interval at the beginning of the sampling intervals where large pixel intensity values are being digitized and the digital count values decrement in smaller interval at the end of the sampling intervals where small pixel intensity values are being digitized. For example, for pixel data expressed in 10 bits, the digital count values can decrement from the MAX count value of 1023 to the MIN count value of 0 in $2^7$ or 128 steps.

In yet another alternate embodiment, when companding is applied, the image capture method of the present invention stores the step number in q bits as the digital pixel data as opposed to storing the corresponding digital count value. For example, when the pixel data is in k=10 bits and q=7, the digital count values step from 1023 to 0 in 128 steps and at each step, a 7-bit value indicative of the step number from 1 to 128 is stored as the pixel data. The actual digital pixel value can be derived by mapping the step number to the associated digital count value, such as by using a look-up table.

Figure 10:
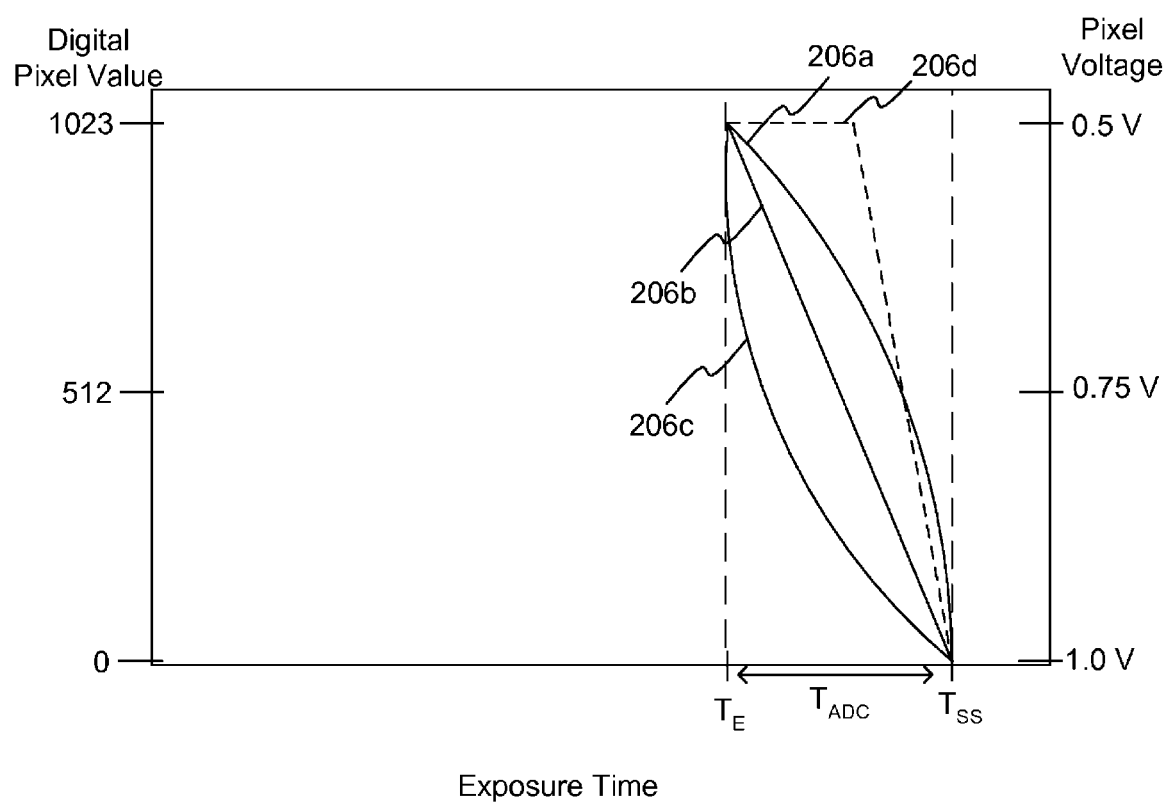
FIG. 10 illustrates four different behaviors of the digital count values which can be applied to practice the image capture method of the present invention.

Referring to FIG. 8, the ADC transfer function is depicted by curve 202 which is a concave-shaped decreasing ramp curve. However, curve 202 in FIG. 8 illustrative only and one of ordinary skill in the art would appreciate that other ADC transfer function can be used to practice the image capture method of the present invention. FIG. 10 illustrates four different behaviors of ADC transfer functions which can be applied to practice the image capture method of the present invention. In FIG. 10, the ADC transfer function can have a concave shape (curve 206a) or a convex shape (206c). The ADC transfer function can also be linear (curve 206b) or piecewise linear (curve 206d). In sum, an ADC transfer function can be designed to meet the needs of the specific imaging application.

As mentioned above, the image capture method of the present invention can operate under the ultra high dynamic range scheme to achieve a dynamic range in the recorded image that is greater than the imaging capability of the image sensor. In one embodiment, a dynamic range increase from k-bit (the intrinsic dynamic range capability) to (k+r)-bit can be achieved where r can be a fraction or an integer. In accordance with the present invention, the image capture method under the ultra high dynamic scheme operates in the same manner as the intrinsic dynamic scheme described with reference to FIGS. 7A and 7B, except for the selection of the initial exposure time. Under the ultra high dynamic range scheme, a very short initial exposure time $T_E$ is selected so that sampling of the pixel intensity values begins soon after the beginning of the snapshot. The amount of dynamic range increase is r bits where $$r = \log_2 \frac{T_{SS}}{T_E}.$$

By selecting an initial exposure time $T_E$ that is very small compared to the snapshot time $T_{SS}$, a large increase in dynamic range can be realized. In one embodiment, the initial exposure time can be selected as:

$$T_E = \frac{T_{SS}}{2^r}.$$

Thus, in one exemplary embodiment, the initial exposure time $T_E$ is selected to give a dynamic range increase of r from 1 to 7 bits. Thus, a dynamic range increase of 2× to 128× of the intrinsic dynamic range capability can be achieved.

The operation of the ultra high dynamic range scheme of the image capture method of the present invention will be described with reference to FIG. 9. FIG. 9 is a plot of the pixel intensity values vs. exposure time for three representative pixels A, B, and C in sensor array 402. Referring to FIG. 9, under the ultra high dynamic range scheme, the initial exposure time $T_E$ is selected to be a very short time after the beginning of the snapshot. In one embodiment, the initial exposure time $T_E$ is selected to be $T_{SS}/2^k$ where k is the resolution of pixel data. If the pixel data are expressed in 10 bits, then the initial exposure time $T_E$ will be $T_{SS}/1024$. The digital count values will decrement from the MAX count value (e.g. 1023) to the MIN count value (e.g. 0) over almost the entire exposure time $T_{SS}$, as shown in FIG. 9.

By starting the sampling interval soon after the start of the snapshot and by sampling continuously throughout the entire snapshot of the scene, the resultant digital representation can have a dynamic range beyond the inherent imaging capability of the image sensor. For example, referring to FIGS. 8 and 9, pixel A represents a very bright pixel and has pixel intensity value that saturated soon after the beginning of the snapshot. In other words, the digital pixel value for Pixel A reached the maximum value of 1023 a very short time after the snapshot begins. When the initial exposure time is long and sampling of the pixel intensity values begins near the end of the snapshot, as in FIG. 8, pixel A is already saturated and the image capture method will not be able to distinguish between the pixel intensity values of pixel A and other pixels which also became saturated prior to the beginning of the sampling interval. On the other hand, when the ultra high dynamic range scheme is applied (FIG. 9), the initial exposure time $T_E$ is a very short time after the beginning of the snapshot, the image capture method is able to sample the pixel intensity value for pixel A before the pixel becomes saturated. In this manner, the pixel intensity values of pixel A and other brightly illuminated pixels can be captured and recorded before the pixels became saturated.

In the present embodiment, pixel intensity values are sampled throughout the entire exposure of the snapshot and pixel data in the form of digital count values are stored in the data memory, such as data memory 412. The digital count values are in themselves time stamps of the pixel intensity value because the frequency of the sampling interval is known. Thus, the final image of the scene can be derived by normalizing the pixel data to the total exposure time.

In accordance with the present invention, normalization (or linearization) of pixel data is carried out by determining the slope of the pixel intensity value vs. exposure time for each pixel using the recorded pixel data. The normalized pixel intensity value at the total exposure time can then be calculated using the slope and the snapshot time $T_{SS}$. The slope of the pixel intensity value for each pixel can be determined in one of two ways.

In one embodiment, the image sensor in which the image capture method of the present invention is practiced, such as image sensor 400 of FIG. 3, performs correlated double sampling. Correlated double sampling (CDS) is a method applied in image sensors for eliminating non-uniformity in the sensor array. CDS can be used to correct for the variable comparator offset between the photodetectors in the array. When CDS is implemented, the sensor array is reset at the start of each capture. Then, the voltage present at each of the photodetectors (also called the "CDS reset value" or "reset value") is measured and stored in a designated memory location of the data memory of the image sensor, such as data memory 412. Subsequently, for each frame of pixel data captured by the sensor array, the stored reset values are subtracted from the corresponding pixel intensity value to derive the pixel data. When CDS is applied in an image sensor, the CDS reset value and the measured pixel intensity value can be used to derive the slope of the pixel intensity value vs. exposure time for each of the pixels in the sensor array. Specifically, the slope is given as:

$$\text{Slope} = \frac{V_b - V_a}{T_b - T_a},$$

where $V_b$ is the pixel intensity value for a given pixel recorded at exposure time $T_b$ and $V_a$ is the CDS reset value for that pixel recorded at time $T_a$ (generally 0). The normalized pixel intensity value $V_N$ at the final exposure time $T_{SS}$ is given as follows:

$$V_N = \text{Slope} \times T_{SS},$$

where $T_{SS}$ is the total exposure time for the snapshot. The resultant normalized pixel intensity value $V_N$ has a dynamic range of 1 to $2^{k+r}$.

In another embodiment, the slope of the pixel intensity value can be computed using just the recorded pixel data. This method is applied either when CDS is not performed in the image sensor or when the errors introduced by the non-uniformity in the sensor array are negligible. In this case, the slope of the pixel intensity value is estimated by:

$$\text{Slope} = \frac{V_b}{T_b},$$

where $V_b$ is the pixel intensity value for a given pixel recorded at exposure time $T_b$. The normalized pixel intensity value $V_N$ at the final exposure time $T_{SS}$ can be computed in the same manner above where:

$$V_N = \text{Slope} \times T_{SS}.$$

By applying the ultra high dynamic scheme in the image capture method of the present invention, a dynamic range increase over the inherent imaging capability of the image sensor can be realized. Furthermore, by storing the digital pixel data recorded at each of the sampling intervals, no additional memory is required to store the pixel data even though the pixel data has increased dynamic range. For example, when an image sensor records pixel data in 10 bits and the initial exposure time is selected to be $T_{SS}/2^{10}$, a 10 bits dynamic range increase can be achieved (where $r = \log_2 (T_{SS}/(T_{SS}/1024))$). The resultant dynamic range for the image sensor is 1024*1024 or approximately 1 million levels. Thus, even though pixel data are stored in only 10 bits, the dynamic range of image capture can be increased to 20 bits by the application of the ultra high dynamic range scheme in the image capture method of the present invention. In other examples, a 7-bit dynamic range increase can be realized by selecting an initial exposure time to be at $T_{SS}/128$. By selecting the desired initial exposure time, the desired amount of dynamic range increase, r, can be obtained.

The amount of dynamic range increase, r, that can be realized using the image capture method of the present invention is limited by how fast the image sensor can complete the first measurement. In general, the initial exposure time can be selected from a time $T_{MIN}$ to a time $T_{MAX}$, where time $T_{MIN}$ is the minimum time it takes for the image sensor to complete one sampling interval, and $T_{MAX}$ is the snapshot time minus the time it takes for the image sensor to complete all the sampling intervals. Typically, $T_{MAX}$ is near $T_{SS}$ as the sampling and digital conversion time ($T_{ADC}$) is assumed to be so small that it is negligible. Specifically, $T_{MAX}$ is given as:

$$T_{MAX} = T_{SS} - (T_{sample} * N_{TOT}),$$

where $T_{sample}$ is the time to complete one sampling interval and $N_{TOT}$ is the total number of steps used to decrement from the maximum digital count to the minimum digital count. When time $T_{MIN}$ is selected as the initial exposure time, a very large dynamic range increase can be realized. When time $T_{MAX}$ is selected as the initial exposure time, the intrinsic dynamic range scheme is practiced.

According to an alternate embodiment of the present invention, the digital count values are provided in Gray code so as to reduce the number of write operations required at each sampling interval. Specifically, when Gray code is used, each step of the digital count value only requires one bit of pixel data to be updated. Thus, in the alternate embodiment, readout circuit 410 of image sensor 400 operates to receive the digital code value from microcode engine 420 and write the only bit of pixel data that is changed into the corresponding memory locations in data memory 412. By using Gray code to reduce the number of write operations, the time it takes image sensor 400 to complete one sampling interval can be greatly reduced.

In one embodiment, by using Gray code for the digital count values, an image sensor can complete a sampling interval in 10 to 40 μs. Thus, in the present embodiment, an initial exposure time of $T_{SS}/350$ or $T_{SS}/1400$ and a sampling frequency of 350× or 1400× can be applied within a snapshot of a still image capture or within the exposure time of a video frame. Thus, a dynamic range increase, r, of 8 to 10 bits can be achieved. The short sampling time required to practice the image capture method of the present invention allows the image sensor to be used in video applications where $T_{SS}$ is limited to 1/60 seconds. Thus, by using the ultra high dynamic range scheme of the image capture method of the present invention, a dynamic range increase of 10 bits or 1024 levels can be realized even for video applications.

In the ultra high dynamic range scheme, companding can also be applied to reduce the number of steps and to reduce the amount of data to be stored for each pixel. For example, the image capture method may have an initial exposure time of $T_{SS}/2^r$ and takes $2^q$ steps to decrement the digital count value from the MAX count to the MIN count. In this configuration, the image capture method can provide an r-bit increase in dynamic range and stores the q-bit step number as pixel data. The q-bit step number can then be translated to the k-bit pixel data value when the pixel data are retrieved, such as by using a look-up table.

The image capture method of the present invention, when implemented in a digital image sensor, realizes numerous advantages. First, the use of a continuous sampling technique with a massively parallel thermometer-code analog-to-digital conversion (ADC) technique allows an ultra-high dynamic range in image capture to be achieved. Second, the image capture method of the present invention can realize an r-bit increase in dynamic range without requiring a larger memory to store the pixel data. In one embodiment, only k+1 bits of memory are required to store the k-bit pixel data. When companding is used, an even smaller amount of memory space is needed. For example, when pixel data is expressed in k bits, only q+1 bits of memory are needed to store the pixel data where q is less than k.

According to another aspect of the present invention, the image capture method is operated to make an efficient use of memory space in the image sensor. In accordance with the present embodiment of the present invention, the image capture method operates to generate pixel data in k+1 bits where k+1 bits of memory space are allocated for each pixel element as in the previous embodiments. In effect, the memory space allocated for the threshold indicator bit for each pixel element is recovered to store an additional bit of pixel data, thereby increasing the resolution of the image sensor without the corresponding increase in memory space. When an image sensor practices the image capture method according to the present embodiment, the size of the data memory remains at N×M×(k+1) bits but the pixel data are now expressed in k+1 bits.

Figure 11:
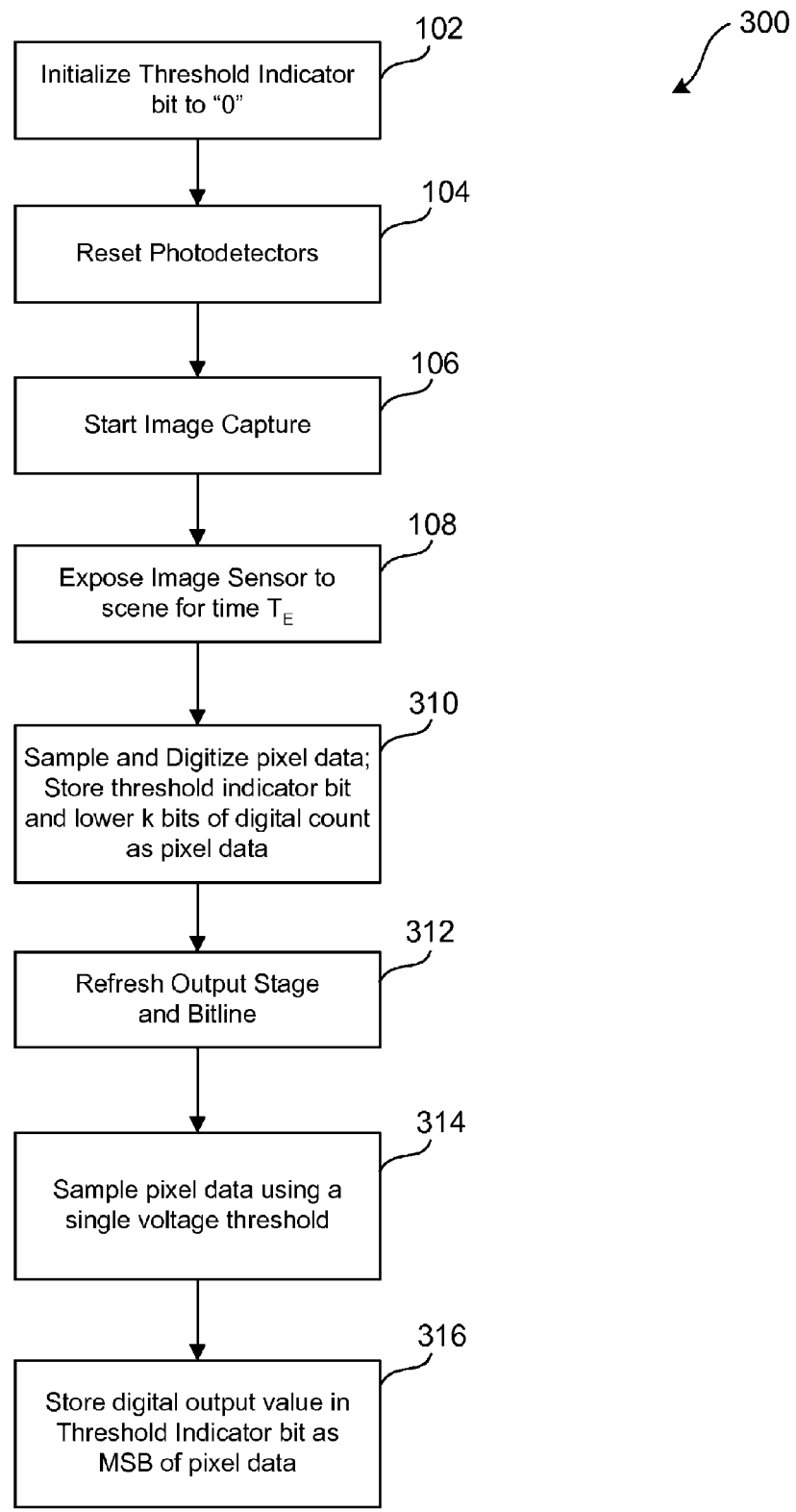
FIG. 11 is a flowchart illustrating the image capture method according to an alternate embodiment of the present invention.

FIG. 11 is a flowchart illustrating an image capture method 300 according to an alternate embodiment of the present invention. Like operations in method 100 (FIGS. 7A and 7B) and method 300 are given like reference numerals to simplify the discussion. Referring to FIG. 11, image capture method 300 initializes the threshold indicator bit and resets the photodetectors in the sensor array (steps 102 and 104). When image capture begins, the image sensor is exposed to the scene for an initial exposure time $T_E$ (steps 106 and 108). As described above, $T_E$ can be selected to be near the start of the snapshot or near the end of the snapshot to obtain the desired dynamic range in the recorded digital image.

At step 310, sampling and digitizing of the pixel intensity values are carried out. In method 300, step 310 encompasses steps 110 to 130 of method 100 of FIGS. 7A and 7B with the exception that the digital count value is in k+1 bits and when the digital count is to be recorded, only the lower k bits of the digital count value is stored. In effect, a digital count value is initialized and decrements from the MAX count value to the MIN count value at each sampling interval. When the pixel voltage for a given pixel is less than the analog reference voltage corresponding to a digital count value, the lower k bits of the digital count value is stored as the pixel data for that pixel and the threshold indicator is set to prevent further update of the pixel data. Throughout the entire sampling and digitizing process of step 310, the threshold indicator bit functions as described in method 100 to allow or prevent update of pixel data stored for each pixel element in the data memory.

At the end of the sampling and digitizing step, image capture method 300 refreshes the output stage of each pixel element and also refreshes the bitlines to their respective precharge value (step 312). For example, referring to FIG. 4, the dynamic storage node (capacitor 511) is reset to zero volt and the bitline is precharged to a positive voltage (such as Vdd). Then, image capture method 300 samples the pixel intensity values again using a preselected voltage as the comparator threshold (step 314). The preselected voltage is preferably the mid-point of the pixel intensity range of the image sensor. In this manner, the pixel elements will generate a digital output signal identifying whether the recorded pixel intensity value is in the top half of the intensity range or bottom half. Essentially, the digital output value from the comparison with the preselected voltage is the most significant bit (MSB) of the pixel data which was not recorded during the digitizing step 310. The digital output value for each of the pixel elements will be stored in the memory space allocated for the threshold indicator bit in the data memory. Thus, a total of k+1 bits of pixel data is recorded.

Image capture method 300 is thus able to store an additional bit of pixel data without requiring additional memory space allocation. While the threshold indicator bit is needed during the sampling and digitizing step to determine whether pixel data for a given pixel should be overwritten with a new value, the threshold indicator bit is no longer needed at the completion of the sampling and digitizing step. Thus, in accordance with the present embodiment of the present invention, the memory space allocated for the threshold indicator bit is recaptured for storing an additional bit of pixel data. By making efficient use of the memory space in the data memory, the image resolution of the image sensor can be increased without a corresponding increase in size of the data memory.

In an alternate embodiment, the sampling and digitizing step 310 of image capture method 300 is performed in two segments. In the first segment, sampling and digitizing step 310 compares the pixel intensity values with analog reference voltages corresponding to digital count values that are in the top half of the pixel intensity range. In the second segment, sampling and digitizing step 310 compares the pixel intensity values with analog reference voltages corresponding to digital count values that are in the bottom half of the pixel intensity range. The alternate embodiment is particularly useful when the digital count values are stored as code words to allow the first segment and second segment to have an overlapping comparison range. In one exemplary embodiment, the first segment decrements the digital count value from 1023 to 512 and the second segment decrements from 515 to 0, each of the digital count values represented by a unique codeword. By providing an overlapping range, pixel intensity values which may change slightly during the sampling time can still be sampled and digitized accurately. One of ordinary skill in the art would appreciate that other variations of image capture method 300 are possible without departing from the spirit of the present invention.

In the above description, the continuous sampling and massively parallel thermometer-code ADC technique is described as being applied to process image data generated by an image sensor. One of ordinary skill in the art would appreciate that the continuous sampling and massively parallel thermometer-code ADC technique can be applied in other applications as well. The method of the present invention is applicable for converting a large number of analog signals that are monotonic in nature, that is, the signals are either staying the same or increasing, or the signals are either staying the same or decreasing. In the case where the signals are decreasing, the analog-to-digital conversion will of course apply an increasing ramp digital count values instead.

The above detailed descriptions are provided to illustrate specific embodiments of the present invention and are not intended to be limiting. Numerous modifications and variations within the scope of the present invention are possible. For example, in the above description, a snapshot of a scene is described as the total exposure time used by an image sensor to capture an image. When the image sensor is applied in an imaging device using an electronic shutter, the image capture method of the present invention operations to sample the pixel intensity values during the snapshot of a scene. However, the image capture method of the present invention can also be applied to an imaging device using a mechanical shutter provided that the mechanical shutter closes after the image capture completes. In that case, the sampling of the pixel intensity values can begin after the mechanical shutter opens and completes before it closes in order to capture an ultra-high dynamic range image. Thus, in an alternate embodiment, the total exposure time is the entirety of the snapshot (i.e. capture) time and the sampling of the pixel intensity values begins with the opening of the shutter plus an initial capture time ($T_{min}$). Digital pixel data having a dynamic range intrinsic to the image sensor can also be obtained. The present invention is defined by the appended claims.

We claim:

1. A method in an image sensor for digitally recording an image of a scene within a snapshot of said scene, said image sensor comprising a two-dimensional array of pixel elements, said method comprising:

after an initial exposure period within said snapshot, sampling pixel intensity values at said pixel elements at a plurality of sampling intervals within said snapshot, each of said pixel intensity values being indicative of a light intensity value impinging on each of said pixel elements in said array, wherein said snapshot is the total exposure time used by the image sensor to capture the image of the scene;

providing an analog reference voltage corresponding to a digital count value which digital count value decrements from an initial count value to a final count value at said plurality of sampling intervals;

comparing said pixel intensity values to said analog reference voltage at each of said plurality of sampling intervals;

if said pixel intensity value of a first pixel element is less than said analog reference voltage at a first exposure time, generating an output signal having a first value at said first pixel element;

in response to said output signal having said first value, recording said digital count value corresponding to said analog reference voltage at said first exposure time as pixel data associated with said first pixel element; and prior to said snapshot of said scene, setting a threshold indicator bit in a data memory of said image sensor associated with each of said pixel elements in said array to an initial value different than said first value, wherein said recording said digital count value comprises:

if said threshold indicator bit associated with said first pixel element has a previous value different than said first value, storing in said data memory said output signal as said threshold indicator bit and storing said digital count value corresponding to said analog reference voltage at said first exposure time as pixel data associated with said first pixel element.

2. The method of claim 1, wherein said providing an analog reference voltage comprises:

generating said digital count value which decrements from said initial count value to said final count value; and converting said digital count value to a corresponding analog reference voltage, said analog reference voltage being inversely proportional to said digital count value and incrementing from an initial voltage value to a final voltage value.

3. The method of claim 2, further comprising:

prior to said snapshot of said scene, setting a threshold indicator bit in a data memory of said image sensor associated with each of said pixel elements in said array to an initial value different than said first value.

4. The method of claim 3, wherein said recording said digital count value comprises:
   if a threshold indicator bit associated with each of said pixel elements has a previous value different than said first value, storing in said data memory at each of said plurality of sampling intervals said digital count value as pixel data associated with each of said pixel elements; and
   storing in said data memory said output signal having said first value as said threshold indicator bit associated with said first pixel element at said first exposure time.

5. The method of claim 4, wherein said digital count value is expressed in Gray code and said storing in said data memory at each of said plurality of sampling intervals said digital count value as pixel data associated with each of said pixel elements comprises:
   storing said initial count value of said digital count value at a first one of said plurality of sampling intervals; and
   storing only a bit of said digital count value which as changed when said digital count value decrements at said plurality of sampling intervals.

6. The method of claim 2, wherein said pixel data comprises a k-bit value, k being an integer, said initial count value is $2^k-1$ and said final count value is 0.

7. The method of claim 6, wherein said initial voltage value is set between 0 and 5 volts and said final voltage value is set between 0 and 5 volts.

8. The method of claim 6, wherein said digital count value decrements linearly with respect to said plurality of sampling intervals, said plurality of sampling intervals comprise $2^k$ number of sampling intervals.

9. The method of claim 6, wherein said digital count value comprises a k-bit value, k being an integer, and decrements in $2^q$ steps from said initial count value to said final count value, q being a fraction or an integer number less than k.

10. The method of claim 9, wherein a step number associated with each of said $2^q$ steps is stored as said pixel data such that said pixel data is stored as q-bit values.

11. The method of claim 9, wherein said digital count value decrements in larger intervals in the beginning of said $2^q$ steps and decrements in finer intervals near the end of said $2^q$ steps.

12. The method of claim 9, wherein said digital count value decrements based on a transfer function, said transfer function comprising any one of a concave curve, a convex curve, and a piecewise linear curve.

13. The method of claim 1, wherein said sampling begins with an opening of a shutter plus an initial capture time in said snapshot of said scene.

14. A method in an image sensor for digitally recording an image of a scene within a snapshot of said scene, said image sensor comprising a two-dimensional array of pixel elements, said method comprising:
   setting a threshold indicator bit in a data memory of said image sensor associated with each of said pixel elements in said array to an initial value;
   after an initial exposure period within said snapshot, sampling pixel intensity values at said pixel elements at a plurality of sampling intervals within said snapshot, wherein said snapshot is the total exposure time used by the image sensor to capture the image of the scene, each of said pixel intensity values being indicative of a light intensity value impinging on each of said pixel elements in said array;
   providing an analog reference voltage corresponding to a digital count value which digital count value has k+1 bits, k being an integer, and decrements from an initial count value to a final count value at said plurality of sampling intervals;
   comparing said pixel intensity values to said analog reference voltage at each of said plurality of sampling intervals;
   if said pixel intensity value of a first pixel element is less than said analog reference voltage at a first exposure time, generating an output signal having a first value at said first pixel element;
   in response to said output signal having said first value, storing the lower k bits of said digital count value corresponding to said analog reference voltage at said first exposure time as pixel data associated with said first pixel element and storing said output signal as said threshold indicator bit when said threshold indicator bit associated with said first pixel element has a previous value the same as said initial value;
   providing a final analog reference voltage corresponding to a digital count value being the mid-point of a range between said initial count value and said final count value;
   comparing said pixel intensity values to said final analog reference voltage;
   if said pixel intensity value of said first pixel element is less than said final analog reference voltage, generating an output signal having said first value at said first pixel element; and
   storing said output signal in said data memory in memory space allocated for said threshold indicator bit, said output signal being said most significant bit of said pixel data, said pixel data having k+1 bits.

15. The method of claim 14, wherein said digital count value decrements from said initial count value to said final count value in a first and second segments, the count values at the end of said first segment overlapping with the count values at the beginning of said second segment.

16. An image sensor, comprising:
   a sensor array comprising a two-dimensional array of pixel elements, said sensor array outputting digital signals representing an image of a scene;
   a data memory, in communication with said sensor array, for storing k-bit pixel data, k being an integer, and a 1-bit threshold indicator for each of said pixel elements, said image sensor initializing said threshold indicator to an initial value;
   a digital counter for generating digital count values which decrements from a first count value to a second count value; and
   a digital-to-analog (D/A) converter coupled to receive said digital count values and providing a corresponding analog reference voltage to each of said pixel elements of said sensor array;
   wherein said sensor array samples pixel intensity values generated by said array of pixel elements at a plurality of sampling intervals after an initial exposure period within a snapshot of a scene, wherein said snapshot is the total exposure time used by the image sensor to capture the image of the scene, said pixel intensity values being compared with said analog reference voltage corresponding to said decrementing digital count values at each of said plurality of sampling intervals, and said sensor array generates an output signal indicative of a status being the comparison result of said pixel intensity value at each of said pixel elements,
   wherein at each of said plurality of sampling intervals, if a pixel intensity value at a first pixel element is less than said analog reference voltage, said first pixel element generates said output signal having a first value, said data memory stores said output signal as said threshold indicator and said digital count value corresponding to said analog reference voltage as pixel data for said first pixel element when said threshold indicator for said first pixel element has a previous value different than said first value.

17. The image sensor of claim 16, wherein said digital count values are expressed in Gray code.

18. The image sensor of claim 16, wherein each of said pixel elements comprises:
   a photodetector outputting an electrical signal proportional to incident light; and
   a comparator coupled to receive said electrical signal and said analog reference voltage, said comparator generating said output signal indicative of a status being the comparison result of said pixel intensity value.

19. The image sensor of claim 18, wherein each of said pixel elements further comprises:
   a latch for receiving said output signal from said comparator; and
   an output stage for outputting said output signal from said pixel element.

20. The image sensor of claim 18, wherein each of said pixel elements further comprises:
   a first transistor having a gate terminal coupled to receive said output signal from said comparator, a first current handling terminal coupled to a reference voltage, and a second current handling terminal; and
   a second transistor having a gate terminal coupled to a first control signal, a first current handling terminal coupled to said second current handling terminal of said first transistor; and a second current handling terminal coupled to a data line;
   wherein said second transistor couples said output signal to said data line in response to said first control signal.

21. The image sensor of claim 16, wherein said pixel data comprises a k-bit value, k being an integer, said initial count value is $2^k-1$ and said final count value is 0.

22. The image sensor of claim 21, wherein said analog reference voltage is inversely proportional to said digital count values and increments from an initial voltage value to a final voltage value.

23. The image sensor of claim 22, wherein said initial voltage value is between 0 and 5 volts and said final voltage value is between 0 and 5 volts.

24. The image sensor of claim 21, wherein said digital count value decrements linearly with respect to said plurality of sampling intervals, said plurality of sampling intervals comprise $2^k$ number of sampling intervals.

25. The image sensor of claim 21, wherein said digital count value comprises a k-bit value, k being an integer, and decrements in $2^q$ steps from said initial count value to said final count value, q being a fraction or an integer number less than k.

26. The image sensor of claim 25, wherein a step number associated with each of said $2^q$ steps is stored as said pixel data such that said pixel data is stored as q-bit values.

27. The image sensor of claim 25, wherein said digital count value decrements in larger intervals in the beginning of said $2^q$ steps and decrements in finer intervals near the end of said $2^q$ steps.

28. The image sensor of claim 21, wherein said digital count value decrements based on a transfer function, said transfer function comprising any one of a concave curve, a convex curve, and a piecewise linear curve.

29. The image sensor of claim 16, wherein said pixel intensity values are sampled immediately after an opening of a shutter plus an initial capture time in said snapshot of said scene.

* * * * *